United States Patent [19]

Lusk

[11] 4,133,970

[45] Jan. 9, 1979

[54] ELECTRICAL INSULATION SYSTEM

[75] Inventor: George E. Lusk, Woodstock, Ill.

[73] Assignee: Joslyn Mfg. and Supply Co., Chicago, Ill.

[21] Appl. No.: 645,387

[22] Filed: Dec. 30, 1975

[51] Int. Cl.² ............... H02G 15/22; H01B 3/20; H01B 3/30

[52] U.S. Cl. ................... 174/19; 174/17 LF; 174/73 R; 252/63; 252/316; 264/6; 264/12; 428/296

[58] Field of Search ............ 174/12 BH, 14 BH, 19, 174/20, 25 R, 25 C, 30, 73 R, 73 SC, 75 R, 75 D, 80, 110 SR, 110 F, 17 LF; 210/496, 504, 508; 252/63, 63.2, 64, 315, 316; 264/6, 12; 428/227, 296, 311; 336/58, 94

[56] References Cited

U.S. PATENT DOCUMENTS

| | | | |
|---|---|---|---|
| 2,117,696 | 5/1938 | Brandt | 174/20 |
| 2,961,710 | 11/1960 | Stark | 210/496 X |
| 2,988,469 | 6/1961 | Watson | 264/12 X |
| 3,073,735 | 1/1963 | Till et al. | 210/496 X |
| 3,399,516 | 9/1968 | Hough, Jr. et al. | 210/496 X |
| 3,532,800 | 10/1970 | Wyly et al. | 174/25 R |
| 3,579,163 | 5/1971 | Cronin | 174/17 LF X |
| 3,795,571 | 3/1974 | Prentice | 428/296 |
| 3,949,137 | 4/1976 | Akrongold et al. | 428/311 |
| 3,959,421 | 5/1976 | Weber et al. | 264/12 X |
| 4,060,583 | 11/1977 | Groves et al. | 174/19 X |

FOREIGN PATENT DOCUMENTS

| | | | |
|---|---|---|---|
| 206017 | 2/1957 | Australia | 174/25 C |
| 761642 | 11/1956 | United Kingdom | 174/25 C |
| 1226455 | 3/1971 | United Kingdom | 174/25 R |

Primary Examiner—Laramie E. Askin
Attorney, Agent, or Firm—Mason, Kolehmainen, Rathburn & Wyss

[57] ABSTRACT

An electrical insulation system includes a new and improved monolithic, polymeric, porous, open cell, fully impregnable, dielectric solid and an impregnating substance that may be applied to the dielectric solid either at the factory prior to shipment or in the field prior to or during installation. The dielectric solid is preformed to enable the quick and easy field installation of the insulation system in electrical apparatus. In addition, the porous, open cell nature of the dielectric solid in which very small communicating open cells are substantially evenly distributed throughout substantially all of the dielectric solid enables a dielectric fluid, such as a dielectric oil, to pass through the dielectric solid and thereby impart the self-healing characteristic of impregnated layered paper insulation to the new and improved insulation system. In a fluid dielectric system, the impregnating substance may be a dielectric oil or other dielectric liquid. In a solid dielectric system, the impregnating substance is used to fill the open cells or voids throughout the dielectric solid and may be an initially low viscosity dielectric liquid that is inserted into the dielectric solid along with an immobilizing agent and subsequently transformed by chemical reaction into a dielectric gel immobilized within the dielectric solid. The dielectric solid may be formed in accordance with either a sintering process or with a filamentizing process.

36 Claims, 8 Drawing Figures

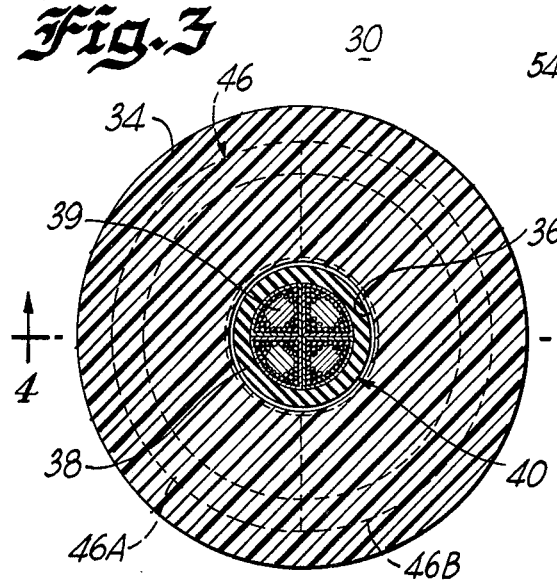
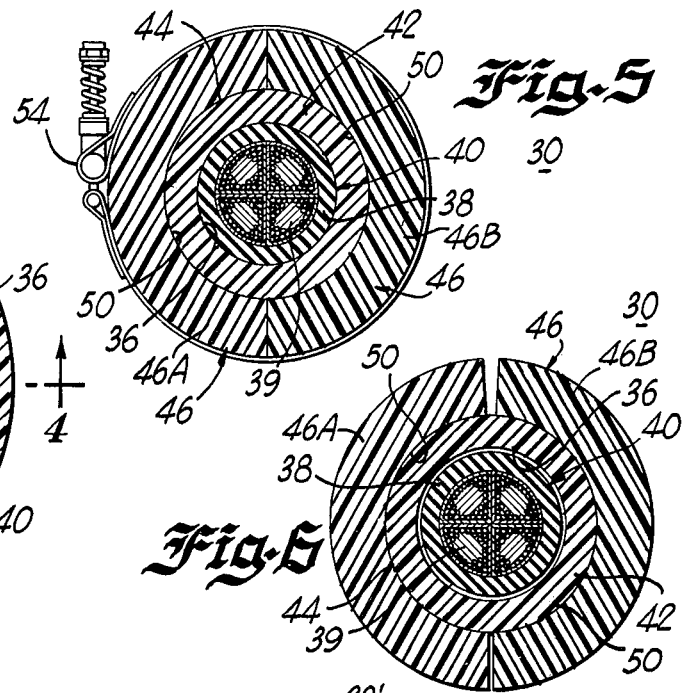
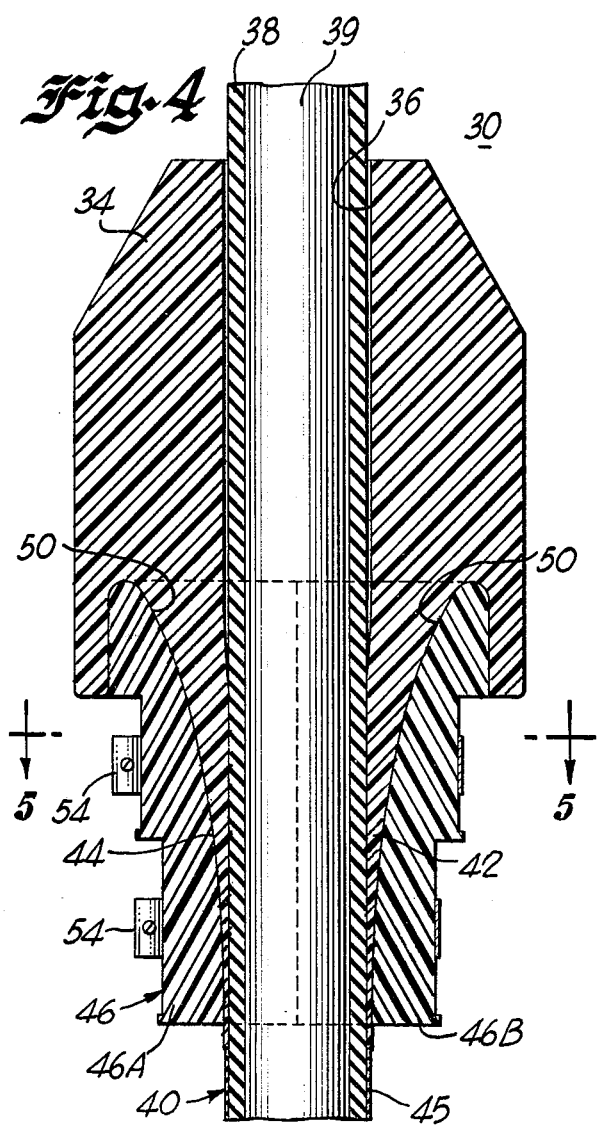
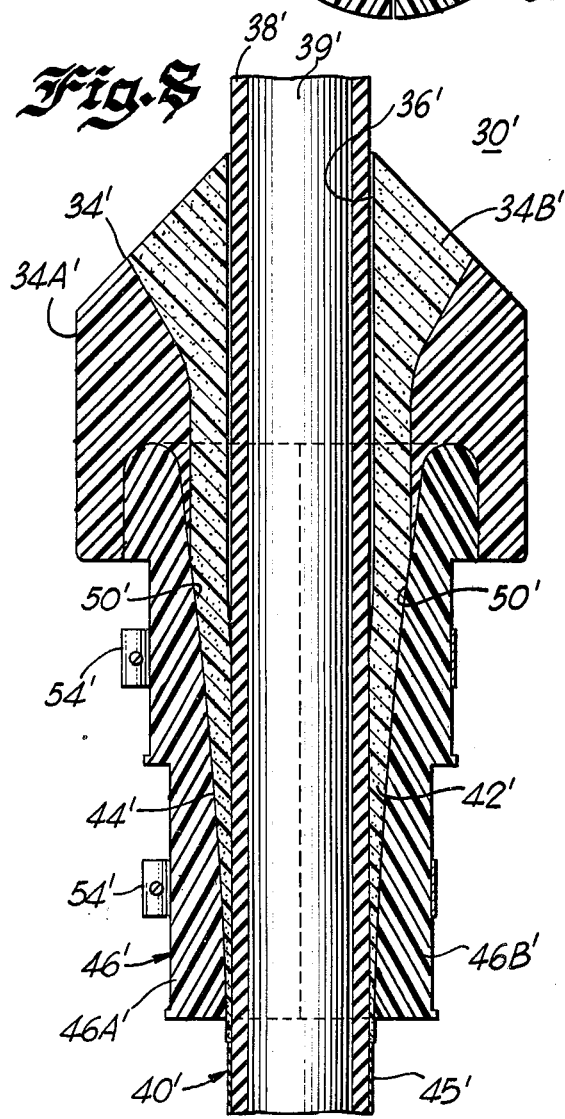

ELECTRICAL INSULATION SYSTEM

BACKGROUND OF THE INVENTION

A. Field of the Invention

The device of the present invention relates generally to a new and improved high voltage electrical insulation system and to a new and improved method for making the insulation system.

B. Description of the Prior Art

Several different types of bulk high voltage insulation systems are used in the prior art, for example, as an electrical stress relief cone in a cable termination or as an insulating sleeve surrounding the electrically interconnected conductors of power cables in a cable joint. Such bulk insulation systems may broadly be categorized as being formed by either a unitary molded insulator or a layered insulator.

U.S. Pat. No. 2,748,184 (hereinafter '184 patent) discloses a well-known type of solid, preformed, unitary molded ceramic insulator 21, formed from wet process porcelain, and used as a stress relief cone. One advantage of unitary molded porcelain insulators is their short field installation time. However, porcelain insulators such as the porcelain stress relief cone 21 of the '184 patent exhibit relatively low dielectric strength, high dielectric loss and a high dielectric constant. In addition, such porcelain insulators are subject to thermal shock failure and to process defects, especially microvoids and cracks in relatively high defect populations. The defect population or number of microvoids and cracks present in the unitary molded insulators is generally proportional to the square of the cross-section of such unitary molded insulators. Thus, the larger unitary molded insulators are much more subject to damage and possible electrical destruction due to their proportionally larger defect population. Due to the high defect population of porcelain insulators, the electrical system in which a porcelain stress relief cone is used must be operated at a lower voltage level to prevent the possible destruction of the porcelain stress relief cone.

Furthermore, due to the mismatch between the relatively low coefficient of thermal expansion of a porcelain insulator as compared to the relatively high coefficient of thermal expansion of common plastic power cable insulation, the greater thermal expansion of the power cable insulation may result in either the cracking of the surrounding porcelain insulator or in the severe deformation of a power cable insulation. In order to prevent such damage, the porcelain insulator must be spaced sufficiently far from the cable insulation to prevent damage, which spacing is undersirable from an electrical stress standpoint. To eliminate this spacing, multiple thin layers of insulation from rolls of paper tape or from paper rolls may have to be applied to the power cable insulation, a task that normally requires a high degree of skill and a long installation time.

Another known type of unitary molded insulator is a cast epoxy resin insulator. The insulating element or sleeve 1 in the cable terminal illustrated in U.S. Pat. No. 3,049,581, the solid sleeve 2 illustrated the cable joint of U.S. Pat. No. 2,967,899 and the solid sleeve 12 illustrated in the cable joint of U.S Pat. No. 3,051,770 are examples of cast epoxy resin insulators. Such cast epoxy resin insulators, as discussed above with respect to the porcelain insulators, have relatively high defect populations by virtue of gas inclusion or heat cracking during formation and thus relatively low dielectric strengths.

A second category of bulk insulation systems are those formed by building up layers of insulating material. For example, vulcanizable insulating material in tape form may be formed by building up layer upon layer until an electrical insulator having a desired configuration is achieved. Subsequently, the layers may be subjected to heat to vulcanize the material. In addition, heat shrinkable thermoplastic material in tape form may be used to also form an electrical insulator by building up successive layers of tape until a desired configuration is achieved. Subsequently, heat is also applied to cause the thermoplastic material to, as far as possible, coalesce into a unitary structure.

Obviously, the disadvantages of these two types of bulk insulation systems are the relatively high probability of defects due to the inability to fully distribute the heat throughout the material. In addition, a relatively high degree of skill and a long field installation time is required to build up the desired insulator configuration by successive layers of tape.

Finally, other common types of layered electrical bulk insulation systems include paper tapes, paper rolls, cloth tapes and plastic films formed into a desired insulator configuration and secured by suitable mechanical fastening means. An example of a paper roll formed by cconcentrically wound layers of paper is illustrated in U.S. Pat. No. 3,322,884. An example of paper tape used to form an insulator is illustrated in the above-mentioned U.S. Pat. No. 3,051,770 in which the bulk insulation 19 is formed by building up successive layers of paper tape.

A major disadvantage of the layered type of electrical insulation system is the relatively high degree of skill and the relatively long installation time required to form an electrical insulator into a desired configuration. A significant advantage, however, of an electrical insulation system formed by oil impregnated or impregnable paper layers is the characteristic self-healing capability wherein localized hot spots or electrical damage within the oil impregnated paper insulation system due to high voltage electrical stresses thereacross may be healed or further damage retarded by the flow of a dielectric fluid, such as a dielectric oil, therethrough.

SUMMARY OF THE INVENTION

An object of the present invention is to provide a new and improved electrical insulation system.

Another object of the present invention is to provide a new and improved polymeric, porous, open cell, fully impregnable, dielectric solid for use in either a fluid or a solid insulation system.

Another object of the present invention is to provide a new and improved method of manufacturing dielectric material.

Another object of the present invention is to provide a new and improved stress relief cone for use in a high voltage cable termination.

Another object of the present invention is to provide a new and improved impregnating substance for an impregnable dielectric solid.

Briefly, the present invention is directed to a new and improved electrical insulation system that includes a monolithic, polymeric, porous, open cell, fully impregnable dielectric solid and an impregnating substance therefor. The word "solid" is used herein in its geometric sense to distinguish between a solid form, such as the electrical stress relief cone 30 (FIG. 2), and a "plane" form, such as a layer of paper or cloth. The present invention may in general be used wherever insulation systems are required in high voltage electrical systems, for example, as power cable insulation, as a stress relief cone in a cable termination or as an insulating sleeve in a cable joint.

The dielectric solid is performed for the quick and easy field installation in high voltage electrical apparatus and has a relatively low modulus of elasticity compared to that of the aforementioned molded ceramic and cast epoxy resin insulators. In addition, the porous nature of the dielectric solid in which very small communicating open cells are substantially uniformly distributed substantially throughout the dielectric solid enables an impregnating substance such as a dielectric oil to pass through the dielectric solid and thereby impart a self-healing capability characteristic of layered paper insulation systems.

The impregnating substance may be a dielectric oil or other dielectric liquid used to fill the communicating open cells throughout the dielectric solid and thereby increase the dielectric strength of the insulation system. The impregnating substance may also be a low viscosity dielectric liquid injected into the dielectric solid along with an immobilizing agent that by chemically reacting with the dielectric liquid increases the viscosity of the dielectric liquid until it becomes a dielectric gel and is thereby immobilized within the dielectric solid.

The dielectric solid may be formed by a filamentizing process in which a thermoplastic resin raised above its melting temperature, if forced through a die to form a spray of thin (for example, 2 to 4 microns in diameter), filament-like particles that impinge on a revolving mandrel to build up a continuous, unitary, porous, open cell, dielectric solid. Alternately, a substantially mechanically and electrically isotropic dielectric solid may be formed by a sintering process in which a preground polymeric resin, for example, a thermoplastic resin, is placed in a mold and is subjected to very high pressure and temperature to form a porous, open cell, polymeric, dielectric solid, having a finished component particle size, for example, in the range of 0.2 to 50 microns.

An electrical insulation system constructed in accordance with the principles of the present invention may provide or exhibit the self-healing capability of oil impregnated paper layer insulators while also providing the short installation time characteristic of performed unitary molded insulators, such as porcelain or cast epoxy resin insulators. In addition, an electrical insulation system constructed in accordance with the principles of the present invention exhibits a vastly superior loss factor, of standard inverse index of merit of the dielectric quality of an electrical insulator, than that of the aforementioned molded ceramic and cast epoxy resin insulators. For example, the loss factor for electrical grade wet processed porcelain is generally about 0.18 and the loss factor for high quality electrical grade epoxy resin is generally about 0.05 while samples of dielectric gel impregnated sintered dielectric solids constructed in accordance with the principles of the present invention have yielded measured loss factors as low as 0.0025. The invention insulation system provides substantially no thermal mismatch with typical power cable insulation, is substantially unaffected by thermal shocks and, as an electrical stress relief cone, is sufficiently deformable to accommodate slight deformations in power cable insulation without leaving a gap between the power cable insulation and the stress relief cone and is easily reworked in the field to match variations in power cable insulation diameter, such as by increasing the inner diameter of the stress relief cone by removing material therefrom.

BRIEF DESCRIPTION OF THE DRAWING

The above and other objects and advantages and novel features of the present invention will become apparent from the following detailed description of a preferred embodiment of the invention illustrated in the accompanying drawing wherein:

FIG. 3 is an enlarged, cross-sectional view of the stress relief cone of FIG. 2 taken along line 3—3 of FIG. 2;

FIG. 4 is an enlarged, fragmentary, cross-sectional view of the stress relief cone of FIG. 2 taken along line 4—4 of FIG. 3;

FIG. 5 is an enlarged, cross-sectional view of the stress relief cone of FIG. 2 taken along line 5—5 of FIG. 4;

FIG. 6 is an enlarged, cross-sectional view similar to the view of FIG. 5 of the stress relief cone of FIG. 2 prior to the application of a compressive retaining force;

FIG. 8 is an enlarged, fragmentary cross-sectional view similar to the view of FIG. 4 of an alternate embodiment of an electrical stress relief cone construction in accordance with the principles of the present invention.

DESCRIPTION OF THE PREFERRED EMBODIMENT

In accordance with the important feature of the present invention, a new and improved insulation system includes a new and improved monolithic, polymeric, porous, open cell, fully impregnable, dielectric solid and a non-gaseous impregnating substance, that is, an impregnating substance other than air or gas, therefor that is especially adapted for use in high voltage electrical insulation systems.

The dielectric solid is preformed in the factory to a desired insulator configuration and includes a plurality of open cells substantially uniformly distributed substantially throughout the dielectric solid to enable the impregnation thereof by a suitable dielectric impregnating substance, for example, a dielectric fluid or a dielectric gel. In a fluid dielectric insulation system, the porous, open cell, dielectric solid permits the flow of the dielectric fluid, for example, a dielectric oil, therethrough and thus exhibits the self-healing characteristic of oil impregnated layered paper insulation systems. The dielectric solid may also be impregnated by an initially low viscosity dielectric liquid along with an immobilizing agent that chemically reacts with the dielectric liquid to increase its viscosity and eventually transform the dielectric liquid into a dielectric gel immobilized within the dielectric solid to thereby fill the communicating open cells throughout the dielectric solid.

In accordance with an important feature of the present invention, the dielectric solid may be formed in accordance with either one of the following two processes. The first process is referred to hereinabove and hereinafter as a filamentizing process (FIG. 1) which is essentially a modification of the continuous web formation process described in a publication entitled "Melt Blowing Nonwoven Web Technology" by Dwight T. Lohkamp published by the ESSO Research and Engineering Company of Raytown, Texas.

Figure 1:
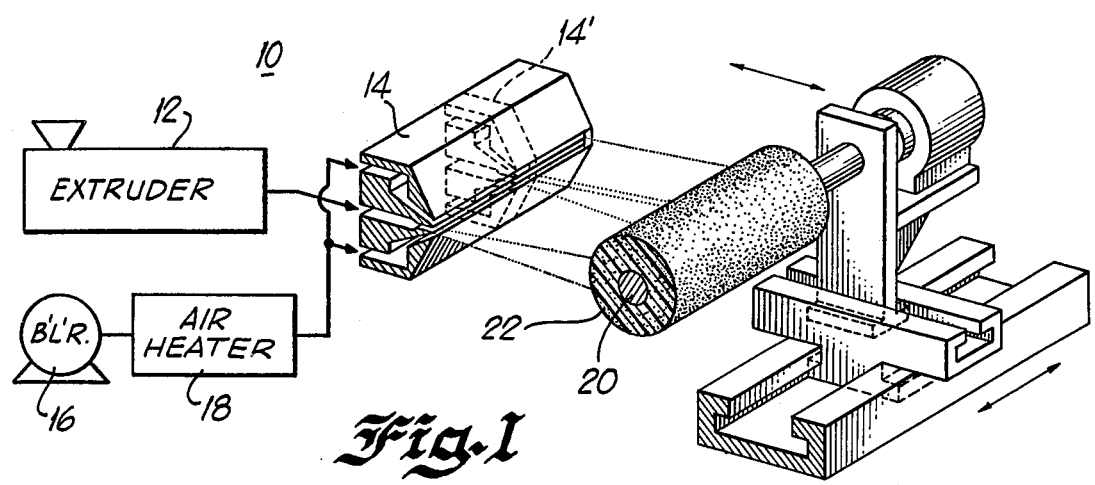
FIG. 1 is a diagrammatic representation of a filamentizing process used to form a polymeric, porous, open cell, fully impregnable, dielectric solid for use in an electrical insulation system in accordance with the principles of the present invention.

FIG. 1 illustrates a filamentizing process system 10 for manufacturing a porous, open cell, polymeric, dielectric solid in accordance with the principles of the present invention. The system 10 includes an extruder 20 12 into which polymeric resin particles are fed to be heated and melted. The extruder temperature varies depending on the specific type of polymeric material being used to form the dielectric solid. From the extruder 12, the molten polymeric material enters a die 14. The die 14 forms thin streamers of molten polymeric material. One or more high temperature, high velocity air streams from a blower 16 and an air heater 18 transport, stretch and form the streamers into thin (for example, 2 to 4 microns in diameter) filaments.

As opposed to the web formation process described in the above-mentioned publication, the filaments coalesce to form the unitary, porous, open cell dielectric solid 22 to any desired thickness upon a revolving take-up mandrel 20. Preferably, the mandrel 20 is movable with respect to the die 14 both in a direction parallel to the longitudinal axis of the mandrel 20 and in a direction towards or away from the die 14, thereby enabling the solid 22 to be formed in any desired regular or irregular configuration on the mandrel 20. The positioning of the mandrel 20 may be manually or automatically controlled to form the dielectric solid 22 in the desired configuration.

In another embodiment, the filaments may be directed to an elongated current conductor from one or more dies disposed about the periphery of the conductor to thereby form electrical insulation of a desired thickness directly on the current conductor in the formation of a high voltage power cable. The insulation thus formed would be impregnated by a dielectric gel or a dielectric liquid discussed hereinafter.

In accordance with a further important feature of the present invention, the spacing between the mandrel 20 and the die 14 is controlled such that the thermoplastic filaments emanating from the die 14 are at a sufficiently high temperature upon impact at the outer surface of the solid 22 to thermally bond, at least to a minor extent, with adjacent filaments. The required initial spacing between the revolving mandrel 20 and the die 14 to achieve the thermal bonding of the particles at the outer surfaces of the solid 22 varies depending upon the particular thermoplastic resin being used to form the solid 22. In addition, in order to insure the formation of a uniform porosity throughout the solid 22, the mandrel 20 is, as discussed above, controllably movable with respect to the outlet of the die 14 to space the outer surface of the solid 22 at a substantially constant distance from the outlet of the die 14. The rotational speed of the mandrel 20 is controlled to maintain the peripheral velocity of the outer surface of the solid 22 constant as the thickness of the solid 22 increases to achieve product uniformity.

Finished particle size of the filaments that form the solid 22 may be varied by adjusting the temperature of the extruder 12 and/or the temperature and pressure of the air streams from the blower 16 and the heater 18. In accordance with a specific embodiment of the present invention, the solid 22 was formed from polypropylene resin with an average finished particle diametric size of 4 microns. A specific preferred range for the finished component particle diametric size of the solid 22 is 0.2 microns to 50 microns, depending upon the impregnating substance.

In order to increase the apparent or relative density of the solid 22, that is the actual density of the solid 22 as compared with the density of a completely solid or voidless block of material occupying the same volume as the solid 22, the mandrel 20 may be moved closer to the outlet of the die 14. While a high apparent density of the solid 22 is beneficial in imparting a higher dielectric strength to the solid 22 in an electrical insulation system, the probability of reducing the number of communicating open cells distributed throughout the solid 22 increases as the mandrel 20 is moved closer to the die 14. Increasing the apparent density of the solid 22 also reduces its compressibility which may make the solid 22 more suitable for those applications requiring a relatively rigid dielectric member.

Although, in a specific embodiment, polypropylene resin was used to form the solid 22, other polymeric materials, specifically other thermoplastic materials and possibly mixtures of thermoplastic materials may be used. For example, polyethylene, nylon, polycarbonate, polyester, vinylidene fluoride and polystyrene resins could be used to form the solid 22 in accordance with the filamentizing process of FIG. 1.

The solid 22 may be formed into a desired configuration as described above or may be initially cut roughly to the desired configuration and subsequently machined to its finished configuration with a very high speed, self-cleaning and self-cooling, wire brush wheel that wears away the outer surface of the solid 22 until the finished configuration is achieved. The high speed, self-cleaning and self-cooling wire brush wheel is used in order to prevent the generation of a high amount of frictional heat at the outer surface of the solid 22 since such heat could result in the sealing of the outer surface.

In accordance with a further important feature of the present invention, a sintering process may be used to form a polymeric, porous, open cell, fully impregnable, dielectric solid from any one of several thermoplastic resins, such as the resins set forth above. In accordance with a specific sintering process, preground polymeric material, for example, an ultra high molecular weight ($2.8 \times 10^6$) polyethylene resin, available from the Allied Chemical Corporation, is placed in a mold and subjected to a pressure of approximately 6,000 psi for approximately 30 seconds to 2 minutes depending on the thickness of the final part. In general, any particular mold may be used to fashion the dielectric solid either in the form of a right circular cylinder (as illustrated with respect to the solid 22) or in the form of a finished dielectric product, such as an electrical insulator. The dielectric solid formed in the above embodiment is subsequently removed from the mold and is sintered in a circulating air oven at a temperature of from 305° to 335° F for a period of approximately two hours per inch of thickness. Subsequently, the solid is cooled and may be used in that form or machined to a desired part configuration.

The finished particle size of the dielectric solid formed in accordance with the sintering process may be anywhere from 0.2 to 50 microns, and preferably in the range of 0.2 to 4 microns when the impregnant is a dielectric liquid and in the range of 8 to 50 microns when the impregnant is a dielectric gel. The finished particle size and the apparent density of the dielectric solid may be varied by the initial grinding of the thermoplastic resin and by suitably controlling the pressure, temperature and processing time of the sintering process. A range of 0.25 to 0.5 for the apparent density of a dielectric solid formed in accordance with the above-mentioned sintering process is suitable for use in an electrical insulation system.

As discussed above, the inventive electrical insulation system includes a polymeric, porous, open cell, fully impregnable, dielectric solid and an impregnating substance. In selecting a specific polymeric resin for use in forming the dielectric solid, consideration should be given to the chemical, electrical, mechanical and thermal characteristics of the thermoplastic resin, especially in its final form as a dielectric solid. For example, the dielectric solid and the impregnating substance must be mutually chemically stable and nonsoluble. In addition, the dielectric solid must be thermally stable throughout the entire operating temperature range of its electrical system. If the dielectric solid is to be formed by the above-mentioned sintering process, consideration should be given to the grinding characteristics of the thermoplastic resin and the ability of the thermoplastic resin to provide the desired finished particle size.

In addition, with respect to fluid dielectric insulation systems, consideration should be given to the composite specific inductive capacitance (SIC) of the dielectric solid and its impregnating substance as compared to the SIC of the dielectric fluid in which the dielectric solid is immersed. A large mismatch between the composite SIC and the SIC of the surrounding dielectric fluid will result in subjecting the lower SIC material to a higher, undesirable, percentage of the high voltage electrical stresses thereacross. For fluid dielectric insulation systems, such as the high pressure dielectric oil electrical insulation system illustrated in FIGS. 2 through 8, one of several dielectric oils or other dielectric liquids may be used as the impregnating substance; for example, mineral oils, silicone oils, polybutene oils and alkylbenzene liquid may be used.

Where the electrical insulation system does not provide the impregnating substance for the dielectric solid, for example, in a dry electrical insulation system or where desired in a fluid dielectric electrical insulation system, the dielectric solid constructed in accordance with the principles of the present invention may be impregnated by a dielectric gel that is immobilized within and throughout the dielectric solid. The following specific dielectric gels may be considered as impregnating substances: polybutadiene gels, polyurethane gels and silicone gels.

It is to be understood the usage of the term gel will include the condition where the impregnating material is cross-linked to a degree resulting in a low tensile modulus elastomeric state and, therefore, is not completely thermally reversible.

In accordance with this important feature of the present invention, a suitable liquid dielectric impregnant is forced into the pores of the porous, open cell, dielectric solid while the dielectric liquid has a relatively low initial viscosity. After impregnation, the viscosity of the liquid is raised to immobilize the dielectric liquid within the pores of the dielectric solid as a dielectric gel or as an even harder dielectric substance. There are a number of ways to increase the viscosity of the dielectric liquid within the pores of the dielectric solid.

The viscosity of a monomeric or polymeric dielectric material capable of polymerization or further polymerization can be raised by adding thereto a polymerization catalyst. Soon after the catalyst addition and prior to any substantial amount of further catalyzed polymerization, the dielectric solid is impregnated with the mixture. In this manner, the viscosity of the dielectric liquid is low enough for effective impregnation; and, after impregnation, the viscosity can be increased sufficiently to immobilize the dielectric material as the dielectric gel within the pores of the dielectric solid, such as the above-mentioned polyolefins and the other thermoplastic materials. If necessary, a suitable housing may be used to contain the dielectric liquid within the dielectric solid while its viscosity is being increased.

In accordance with an important feature of the present invention, the viscosity of a dielectric liquid is increased to at least twice its original viscosity while that liquid is in the pores of the dielectric solid. Polybutadiene dielectric materials can be purchased having a molecular weight corresponding to a viscosity in the range of 300–2000 centipoises at 80° F. By adding 1 to 6% by weight of a polymerization catalyst, such as a free radical promoter, the viscosity of the polybutadiene can be increased to at least 10,000 centipoises within about one-half hour.

The viscosity of the polybutadiene dielectric material is increased by increasing the molecular weight and/or partially cross-linking the polymer molecules. Since the catalyzed polymerization reaction proceeds more rapidly at higher temperatures, the dielectric solid may be impregnated with the dielectric liquid at room temperature and at low viscosity; and, after impregnation, the dielectric solid may be heated to immobilize the polymeric dielectric liquid within the pores of the dielectric solid. The temperature usually should not be raised above the melting point of the polymeric dielectric solid, 120° F being an effective polymerization temperature.

A preferred polymerization catalyst in forming a polybutadiene dielectric gel for impregnating a porous, open cell, polymeric, dielectric solid is 2,5-dimethyl 5-ditertiary butyl peroxyhexane. However, any of the known peroxy and azo free radical promoters can be used as a polymerization catalyst for polybutadiene.

Polyurethane dielectric gel has also been found to be quite effective for immobilization within the above-mentioned dielectric solids. For impregnation of a polyolefin, it is preferred to begin with a polyurethane having a viscosity in the range of about 1,000–2,500 centipoises at 80° F. The polyurethane does not completely set or cure but forms a substance having a gel consistency and is immobilized within the pores of the dielectric solid. No polymerization catalyst or cross-linking agents need be added to the reactants. As is well known, polyurethane is formed by the reaction of a polyol with a polyisocyanate. By mixing a polyol and a polyisocyanate in the proper stoichiometric ratio, the polyol having a viscosity, for example, of 5,000 centipoises (at 80° F) and the polyisocyanate having a viscosity of about 40 centipoises (at 80° F), a starting polyurethane for impregnation can be obtained having a viscosity in the range of 1,000 to 2,500 centipoises. The viscosity of such a polyurethane dielectric material can be doubled within about one-half an hour at room temperature after impregnation of the dielectric solid.

To impregnate a porous, open cell, polymeric dielectric solid, such as the above-mentioned polyolefins, with a dielectric liquid, a central aperture may be formed in the dielectric solid to receive the dielectric liquid. The aperture is then filled with the dielectric liquid and pressurized to a pressure of, for example, 100 psi to force the dielectric liquid radially outwardly through the pores of the dielectric solid.

In accordance with another procedure, a vacuum-pressure method can be used by placing the dielectric solid in a sealed container, evacuating the air from that container, flooding the dielectric solid with the dielectric liquid and then pressurizing the container, to, for example, 100 psi, to force the dielectric liquid through the evacuated pores of the dielectric solid. Either one of these techniques is effective for impregnating porous, open cell, polymeric, dielectric solids, such as the above-mentioned polyolefins, especially the dielectric solids formed from polyethylene and polypropylene.

Generally, any polymeric dielectric substance, including the above-mentioned polybutadiene gels, polyurethane gels and silicone gels, capable of further polymerization or cross-linking or of having its viscosity increased in some other manner may be considered for use in accordance with the principles of the present invention. Ideally and to realize the full advantage of the present invention, the dielectric substance should have an initially low viscosity, for example, 300–2,500 centipoises, to enable it to fully impregnate a porous, open cell, polymeric, dielectric solid; and its viscosity should be increased while in the pores of the dielectric solid to immobilize the dielectric impregnating substance. Generally, the larger the pores of the dielectric solid, the higher must be the final viscosity of the dielectric impregnating substance to achieve effective immobilization.

Figure 2:
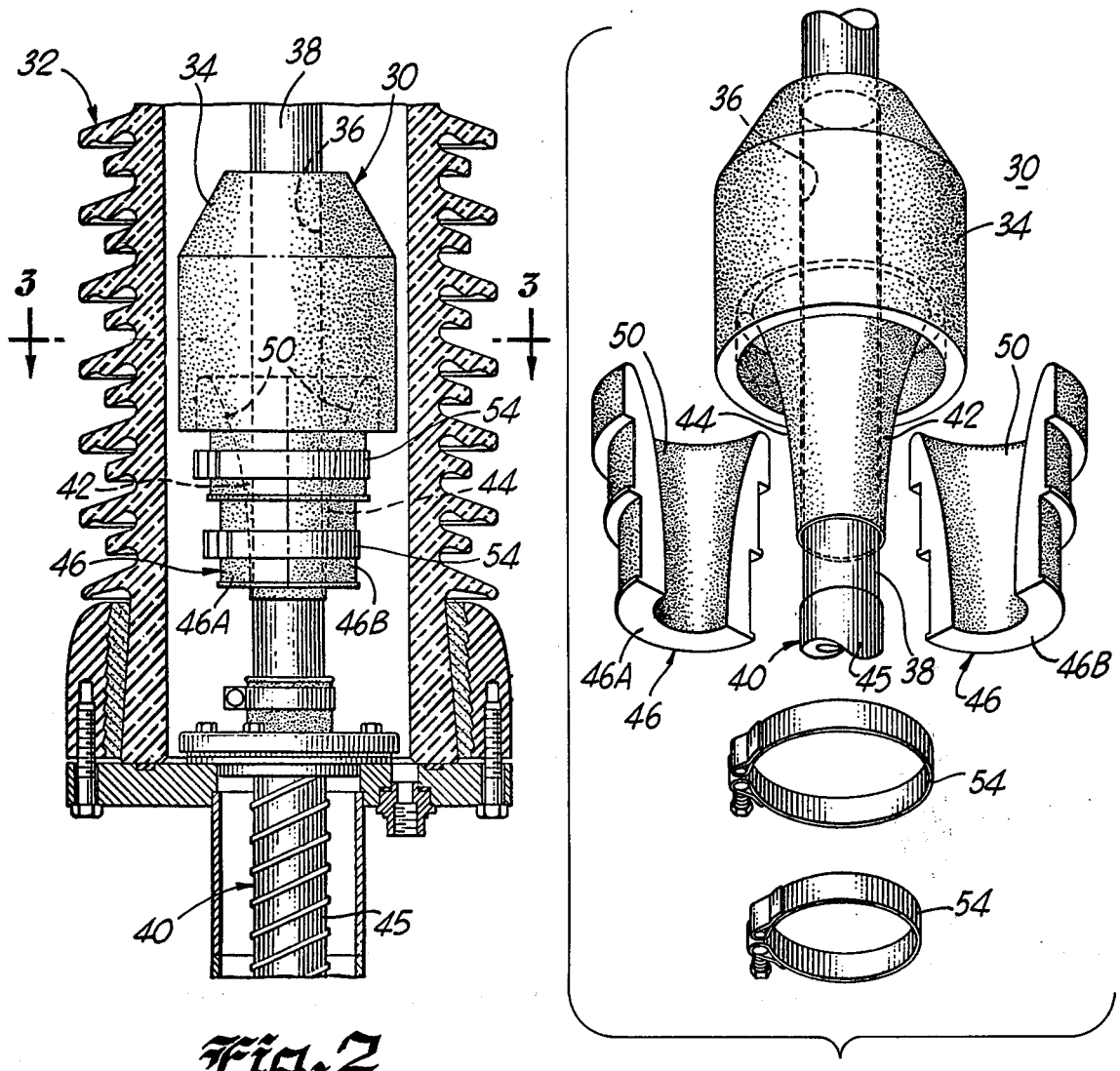
FIG. 2 is a fragmentary, cross-sectional illustration of the lower portion of a high voltage cable termination having a high pressure dielectric oil insulation system and utilizing a stress relief cone constructed in accordance with the principles of the present invention.

In accordance with a specific embodiment of the present invention, a new and improved electrical stress relief cone 30 (FIGS. 2 through 7) is illustrated as immersed in a high pressure dielectric oil insulation system of a 138KV cable termination 32 (only the lower portion of which is fragmentarily illustrated in FIG. 2). The three major parts of a specific embodiment of the stress relief cone 30 are formed from the above-mentioned ultra high molecular weight (2.8 × $10^6$) polyethylene in accordance with the above-mentioned sintering process to provide unitary, polymeric, porous, open cell, fully impregnable, dielectric solids for use in configuring the stress relief cone 30.

The stress relief cone 30 includes a major portion 34 having a longitudinally extending inner bore 36 with an inner diameter slightly greater than the outer diameter of the cable insulation 38 surrounding a segmented, centrally disposed, current carrying conductor 39 (FIGS. 3, 5 and 6) of a high voltage power cable 40 being terminated by the cable termination 32. The major portion 34 includes a longitudinally extending tapered or conically shaped lowermost portion 42 having an outer surface 44 that may be formed in a desired configuration to support a layer of conductive material applied thereto that, in a specific embodiment, is electrically connected to a source of reference potential, such as ground potential through the grounded outer conductive sheath 45 of the power cable 40. In accordance with an important feature of the present invention, the stress relief cone 30 includes a lower, split, outer compressive retaining portion 46 formed by two, generally semi-circular, physically distinct (both from each other and from the major portion 34) lower portions 46A and 46B formed in a specific embodiment from the same ultra high molecular weight polyethylene by the same sintering process, as described above. The lower portions 46A and 46B each include inner and upper peripheral surfaces 50 configured to mate with the outer surface 44 of the portion 42. The lower portions 46A and 46B are used to compress the lowermost portion 42 against the cable insulation 38 and thereby to secure the stress relief cone 30 in position within the cable termination 32, the compressive force being provided by a plurality of hose clamps 54 that engage the outer surfaces of the lower portions 46A abd 46B.

Although, in general, a porous, open cell, polymeric, dielectric solid formed in accordance with the above described sintering process is substantially less compressible than a porous, open cell, polymeric, dielectric solid formed in accordance with the above-mentioned filamentizing process, due to its reduced thickness, the lowermost portion 42 of the inner portion 34 of the stress relief cone 30 is sufficiently compressible to secure the stress relief cone 30 in position against the cable insulation 38.

The major portion 34 and the lower portions 46A and 46B of the stress relief cone 30 are in a specific embodiment formed from the above-mentioned ultra high molecular weight polyethylene by the sintering process such that the average finished particle diametric size, determined by a microscopic examination of the finished product, is approximately 4 microns and the apparent density of the stress relief cone 30 is in the range of 0.25 to 0.5. The stress relief cone 30 may be installed in the cable termination 32 either in a dry condition or impregnated with a desired dielectric liquid or dielectric gel as described above.

Figure 7:
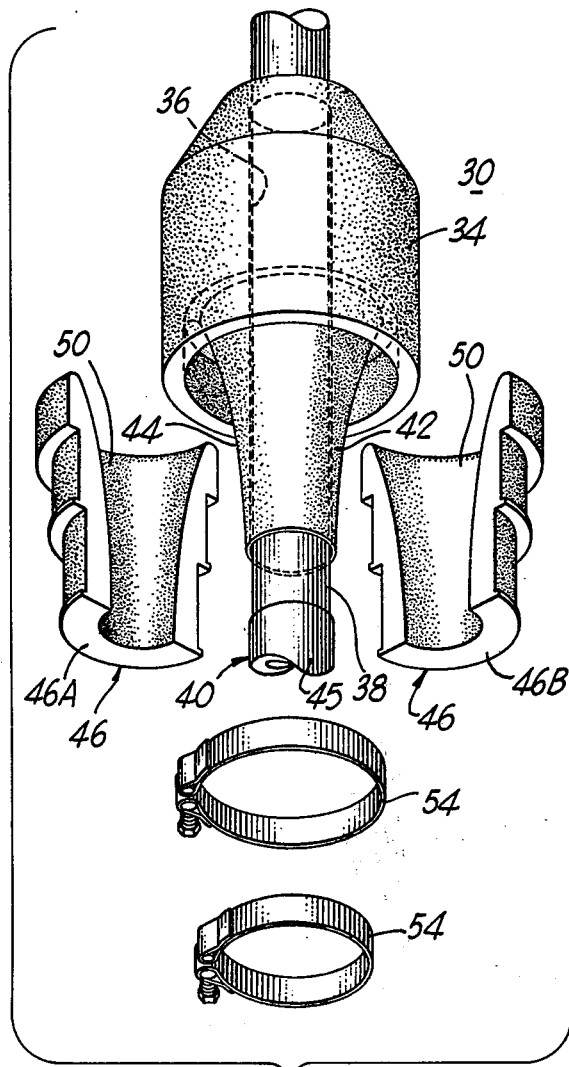
FIG. 7 is an exploded, perspective view of the stress relief cone of FIG. 2 illustrating the method of assembling the stress relief cone over a power cable in a high voltage cable termination.

FIGS. 5 through 7 illustrate the manner in which the stress relief cone 30 may be installed over the power cable 40 in the cable termination 32. Initially, the major portion 34 is installed over the cable insulation 38 until the lowermost portion 42 abuts against the outer conductive sheath 45 of the power cable 40. When the major portion 34 is in this position, the lower portions 46A and 46B are placed in contact with the major portion 34 (FIG. 6) such that the inner and upper surfaces 50 contact and conform to the mating surface 44 of the major portion 34. Subsequently, the hose clamps 54 are positioned about the outer surfaces of the lower portions 46A and 46B and tightened to provide the required compressive retaining force (FIGS. 2, 4 and 5) to retain the stress relief cone 30 in position about the power cable 40 in the cable termination 32.

In accordance with a further important feature of the present invention, an alternate embodiment of an electrical stress relief cone 30' (FIG. 8) is formed as a composite of dissimilar polymeric resin materials assembled together to function as a unitary stress relief cone 30'. In the specific embodiment of FIG. 8, the major portion 34' is formed by two dissimilar porous, open cell, polymeric, dielectric solids 34A' and 34B'. More specifically, the longitudinally extending inner portion 34B' of the major portion 34' may be formed from a polymeric resin in accordance with the filamentizing process or the sintering process while the exterior portion 34A' or the major portion 34' would be formed from a different polymeric resin in accordance with either the filamentizing or the sintering process. The lower portions 46A' and 46B' may be formed from the same polymeric resin as the exterior portion 34A' and in accordance with the same process.

In accordance with a specific embodiment of the present invention, the longitudinally extending interior portion 34B' is formed in accordance with the sintering process from a vinylidene fluoride resin that provides a high-performance plastic consisting of a high molecular weight (that is, above approximately 100,000 and generally in the range of 400,000 to 1,500,000) polymer of vinylidene fluoride, $CH_2=CF_2$. A lower molecular weight polymeric resin may also be used if its dielectric properties are suitable. This particular vinylidene fluoride resin is available from the Pennsalt Chemical Corporation under the name Kynar.

Although the dielectric properties of the vinylidene fluoride resin used to form the interior portion 34B' in accordance with the sintering process are excellent for use in the electrical insulator illustrated in FIG. 8, especially in the region of the high electrical stresses in and adjacent to the cable insulation 38, that particular resin is very expensive. Since the formation of the entire major portion 34' out of the vinylidene fluoride resin would be commercially unacceptable, the stress relief cone 30' is assembled from a longitudinally extending inner portion 34B' formed from sintered vinylidene fluoride resin while the exterior portion 34A' and the lower portions 46A' and 46B' are formed from the above-mentioned sintered ultra high molecular weight polyethylene. The component parts of the composite stress relief cone 30' are held together and the stress relief cone 30' is retained in a fixed position over the power cable 40' by means of the compressive retaining force applied by the hose clamps 54' through the lower portions 46A' and 46B'.

Thus, a particular electrical insulator may be formed from either a single, porous, open cell, polymeric, dielectric solid manufactured from one particular polymeric resin; from a single, porous, open cell, polymeric dielectric solid manufactured from a mixture of polymeric resins; from a plurality of porous, open cell, polymeric, dielectric solids formed from the same polymeric resin; or from a plurality of porous, open cell, polymeric, dielectric solids formed from a plurality of polymeric resins.

In accordance with a further important feature of the present invention, a conductive surface may be applied to either the tapered or conically shaped surface 44 (44') of the inner portion 34 (34') of the stress relief cone 30 (30') or to the inner and upper surfaces 50 (50') of the dielectric portions 46A (46A') and 46B (46B') of the stress relief cone 30 (30'), or to all of the surfaces, to control the electrical stress distribution in the cable insulation 38 (38') and in the stress relief cone 30 (30').

A conductive surface may be applied to any one or more of the surfaces 44 (44') and 50 (50') by means of a conductive slurry that includes carbon particles and a suitable binder in a liquid carrier, such as water, alcohol or a suitable alkane such as heptane. Such carbon particles and binders therefor are very old and well known and have been used for many years to form conductive or semiconductive surfaces in electrical apparatus. The portions of the surfaces of the stress relief cone 30 (30') that are not desired to be coated are masked and the conductive slurry is applied to the remaining portions of the surfaces 44 (44') and 50 (50'). The conductive layer may be applied by dipping the stress relief cone 30 (30') in the conductive slurry or by spraying or painting the surfaces of the stress relief cone 30 (30') with the conductive slurry.

By utilizing a porous, open cell, polymeric, dielectric solid constructed in accordance with the present invention having a very small average finished particle diametric size as described above, the carbon particles and their associated binder particles having a much greater diametric size, adhere to the outer surface of the stress relief cone 30 (30') while the liquid carrier passes through the communicating open cells or voids in the dielectric solid and evaporates or may be evacuated from the dielectric solid. The dielectric solid of the stress relief cone 30 (30') acts as a filter to stop the passage of the carbon particles and the binder particles while permitting the passage of the liquid carrier. The conductive coating thus formed on one or more of the surfaces 44 (44') and 50 (50') is pervious and permits the flow of a dielectric fluid through the dielectric solid forming the stress relief cone 30 (30'). If desired, the conductive surfaces formed on the stress relief cone 30 (30') may be electrically short-circuited to the grounded conductive cable sheath 45 in any convenient manner, such as by the application of conductive tape.

Obviously, many modifications or variations of the present invention are possible in light of the above teachings. For example, where the dielectric solid 22 (FIG. 1) is to be formed in an irregular configuration on the revolving mandrel 20, as when the solid 22 is formed thereon in an essentially finished configuration of an electrical insulator, a die 14' (illustrated in dotted lines in FIG. 1) having an outlet length substantially less than the outlet length of the die 14 and of the solid 22 may be used to provide more accurate control of the deposition of the polymeric filaments used to form the solid 22. It has also been found that while the sixty Hertz dielectric strength of an insulation system constructed in accordance with the principles of the present invention decreases with increasing thickness as is characteristic of known prior art unitary molded electrical insulators, as discussed above, in general, the sixty Hertz dielectric strength of such an insulation system is inversely proportional to the finished particle size of the porous, open cell, polymeric, dielectric solid used in the insulation system. It is believed that smaller finished particle sizes decrease the mean-free ionization paths through the electrical insulation system and thereby increase the dielectric strength of the insulation system. In addition, while having no substantial effect on the sixty Hertz dielectric strength of the insulation system, increasing the molecular weight of the impregnating substance of the insulator system constructed in accordance with the principles of the present invention generally increases the impulse dielectric strength of the insulation system. Thus, it is to be understood that, within the scope of the appended claims, the invention may be practiced otherwise than as specifically described.

What is claimed and desired to be secured by Letters Patent of the United States is:

1. An interrelated group of components capable of being assembled to form a high voltage electrical insulation system comprising means adapted to be disposed about a high voltage current carrying component for electrically insulating said high voltage current carrying component, said electrically insulating means comprising a porous, open cell, polymeric, dielectric solid having a plurality of pores and dielectric means for impregnating said solid and adapted to fill said pores, said dielectric impregnating means comprising a non-gaseous dielectric impregnant, said dielectric impregnant comprising a dielectric gel adapted to be immobilized in the pores of said dielectric solid.

2. An interrelated group of components capable of being assembled to form a high voltage electrical insulation system comprising means adapted to be disposed about a high voltage current carrying component for electrically insulating said high voltage current carrying component, said electrically insulating means comprising a porous, open cell, polymeric, dielectric solid having a plurality of pores and dielectric means for impregnating said solid and adapted to fill said pores, said dielectric impregnating means comprising a non-gaseous dielectric impregnant, said dielectric solid being formed from a plurality of component polymeric particles bonded together to form said dielectric solid, the average finished diametric size of said component particles being in the range of .2 micron to 50 microns.

3. An interrelated group of components as defined in claim 2 wherein said dielectric impregnant comprises a dielectric liquid and said average finished diametric size of said component particles is in the range of 0.2 micron to 4 microns.

4. An interrelated group of components capable of being assembled to form a high voltage electrical insulation system comprising means adapted to be dispose about a high voltage current carrying component for electrically insulating said high voltage current carrying component, said electrically insulating means comprising a porous, open cell, polymeric, dielectric solid having a plurality of pores and dielectric means for impregnating said solid and adapted to fill said pores, said dielectric impregnating means comprising a non-gaseous dielectric impregnant, and electrically conductive material affixed to a surface of said dielectric solid and adapted to provide high voltage stress relief when disposed about said high voltage current carrying component.

5. An interrelated group of components as defined in claim 4 wherein said surface is a conically shaped surface.

6. A high voltage electrical system comprising
a current carrying conductive means and
means providing electrical insulation about said current carrying conductive means, said electrical insulation providing means comprising a porous, open cell, polymeric, dielectric solid having a plurality of pores and dielectric means impregnating said solid and filling substantially all of said pores, said dielectric impregnating means comprising a non-gaseous dielectric impregnant, said non-gaseous dielectric impregnant comprising a dielectric gel immobilized in the pores of said dielectric solid.

7. A high voltage electrical system as defined in claim 6 wherein said dielectric gel is formed from a mixture of an initially low viscosity dielectric liquid and means for raising the viscosity of said dielectric liquid to form said dielectric gel.

8. A high voltage electrical system as defined in claim 7 wherein said viscosity raising means comprises means for raising the viscosity of said low viscosity dielectric liquid to a value at least double the initial value of said low viscosity liquid.

9. A high voltage electrical system as defined in claim 7 wherein said low viscosity dielectric liquid comprises a polybutadiene dielectric liquid.

10. A high voltage electrical system as defined in claim 7 wherein said low viscosity dielectric liquid comprises a silicone dielectric liquid.

11. A high voltage electrical system as defined in claim 6 wherein said dielectric gel is formed from an initially low viscosity polyurethane dielectric liquid.

12. A high voltage electrical stress relief device comprising means for relieving high voltage electrical stresses in the vicinity of a current carrying conductor, said stresses relieving means including a porous, open cell, polymeric, dielectric solid having a plurality of pores and means impregnating said dielectric solid and filling substantially all of said pores, said impregnating means comprising a non-gaseous dielectric impregnant, said dielectric impregnant comprising a dielectric gel immobilized in the pores of said dielectric solid.

13. A high voltage electrical stress relief device comprising means for relieving high voltage electrical stresses in the vicinity of a current carrying conductor, said stresses relieving means including a porous, open cell, polymeric, dielectric solid having a plurality of pores and means impregnating said dielectric solid and filling substantially all of said pores, said impregnating means comprising a non-gaseous dielectric impregnant, said stresses relieving means further including a second, porous, open cell, polymeric, dielectric solid formed from a different polymer than the polymer of said first mentioned dielectric solid and assembled together with said first mentioned dielectric solid as component parts of said high voltage electrical stress relief device.

14. A high voltage electrical stress relief device as defined in claim 13 wherein said first mentioned dielectric solid is formed from a polyethylene resin and wherein said second dielectric solid is formed from a vinylidene fluoride resin.

15. A high voltage electrical stress relief device as defined in claim 13 wherein said first mentioned dielectric solid includes an interior surface configured to mate with an exterior surface of said second dielectric solid such that said second dielectric solid is disposed interiorly of said first mentioned dielectric solid in an assembled condition.

16. A high voltage electrical stress relief device as defined in claim 13 wherein said stresses relieving means further includes third and fourth porous, open cell, polymeric, dielectric solids formed from the same polymer as said first mentioned dielectric solid and assembled together with said first mentioned dielectric solid and said second dielectric solid as component parts of said high voltage electrical stress relief device, said third and fourth dielectric solids each including an interior surface configured to mate with an exterior surface of said second dielectric solid such that said second dielectric solid is disposed interiorly of said third and fourth dielectric solids in an assembled condition.

17. A high voltage electrical stress relief device as defined in claim 16 wherein said first mentioned, said second, said third and said fourth dielectric solids are formed by a sintering process.

18. A high voltage electrical stress relief device as defined in claim 16 wherein said first mentioned, said third and said fourth dielectric solids are formed by a sintering process.

19. A high voltage electrical stress relief device as defined in claim 18 wherein said second dielectric solid is formed by a filamentizing process.

20. A high voltage electrical stress relief device comprising means for relieving high voltage electrical stresses in the vicinity of a current carrying conductor, said stresses relieving means including porous, open cell, polymeric, dielectric solid having a plurality of pores and means impregnating said dielectric solid and filling substantially all of said pores, said impregnating means comprising a non-gaseous dielectric impregnant, said stresses relieving means further including second and third porous, open cell, polymeric, dielectric solids assembled together with said first mentioned dielectric solid as component parts of said high voltage electrical stress relief device, said second and third dielectric solids having interior surfaces configured to mate with an exterior surface of said first mentioned dielectric solid.

21. A high voltage electrical stress relief device as defined in claim 20 wherein said exterior surface of said first mentioned dielectric solid and said interior surfaces of said second and third dielectric solids are generally conically shaped.

22. A high voltage electrical stress relief device as defined in claim 21 wherein said stresses relieving means further includes means disposed about and applying a compressive force to said first mentioned dielectric solid to retain said first mentioned dielectric solid in position about said current carrying conductor.

23. A high voltage electrical stress relief device as defined in claim 22 wherein said force applying means comprises at least one hose clamp.

24. A cable termination having component parts and capable of terminating the end of an elongated power cable having an elongated current carrying conductor, cable insulation surrounding said current carrying conductor and an outer conductive sheath surrounding an elongated portion of said cable insulation, comprising
 an outer rigid dielectric housing adapted to receive said end of said power cable within said housing,
 an elongated electrical stress relief device adapted to be fitted over and to surround an elongated portion of said cable insulation, said electrical stress relief device comprising a porous, open cell, polymeric, dielectric solid having a plurality of pores and means for impregnating said dielectric solid and adapted to fill said pores, said impregnating means comprising a non-gaseous dielectric impregnant.

25. A cable termination as defined in claim 24 wherein said dielectric impregnant comprises a dielectric liquid.

26. A cable termination as defined in claim 25 wherein said dielectric liquid comprises the dielectric oil of a high pressure dielectric oil insulation system adapted to be received within and to substantially fill the interior of said housing and to electrically insulate said end of said power cable.

27. A cable termination as defined in claim 24 wherein said electrical stress relief device further comprises a second, porous, open cell, polymeric, dielectric solid formed from a different polymer than the polymer of said first mentioned dielectric solid and adapted to be assembled together with said first mentioned dielectric solid about said elongated portion of said cable insulation as component parts of said electrical stress relief device.

28. A cable termination as defined in claim 27 wherein said first mentioned solid and said second dielectric solid are formed by a sintering process.

29. A cable termination as defined in claim 24 wherein said electrical stress relief device further comprises second and third porous, open cell, polymeric, dielectric solids adapted to be assembled together with said first mentioned dielectric solid about said elongated portion of said cable insulation as component parts of said electrical stress relief device, said second and third dielectric solids having interior surfaces configured to mate with an exterior surface of said first mentioned dielectric solid.

30. A cable termination as defined in claim 29 wherein said exterior surface of said first mentioned dielectric solid and said interior surfaces of said second and third dielectric solids are generally conically shaped.

31. A cable termination as defined in claim 30 wherein at least portions of said interior surfaces of said second and third dielectric solids include electrically conductive material affixed thereto and adapted to be electrically short-circuited to said outer conductive sheath of said elongated power cable in an assembled condition.

32. A cable termination as defined in claim 31 wherein at least a portion of said exterior surface of said first mentioned dielectric solid includes electrically conductive material affixed thereto and adapted to be electrically short-circuited to said outer conductive sheath of said elongated power cable in an assembled condition.

33. A cable termination as defined in claim 30 wherein said exterior surface of said first mentioned dielectric solid includes electrically conductive material affixed thereto and adapted to be electrically short-circuited to said outer conductive sheath of said elongated power cable in an assembled condition.

34. A cable termination as defined in claim 29 further comprising compression means adapted to apply a compressive force to said first mentioned dielectric solid though said second and third dielectric solids to retain said first mentioned dielectric solid in position about said current carrying conductor.

35. A cable termination in claim 24 wherein said dielectric impregnant comprises a dielectric gel adapted to be immobilized in the pores of said dielectric solid.

36. An interrelated group of components capable of being assembled together as an electrical insulator in high voltage electrical apparatus of the type utilizing a dielectric liquid insulation system comprising
 a porous, open cell, polymeric, dielectric solid having a plurality of pores and
 means for impregnating said dielectric solid and adapted to fill said pores, said impregnating means comprising the dielectric liquid of a dielectric liquid insulation system adapted to provide electrical insulation when contained within said high voltage electrical apparatus, said dielectric solid being formed from a plurality of component polymeric particles bonded together to form said dielectric solid, the average finished diametric size of said component particles being in the range of 0.2 micron to 4 microns.

* * * * *

UNITED STATES PATENT OFFICE
CERTIFICATE OF CORRECTION

Patent No. 4,133,970  Dated Jan. 9, 1979

Inventor(s) George E. Lusk

It is certified that error appears in the above-identified patent and that said Letters Patent are hereby corrected as shown below:

Claim 4, column 13, line 39, change "dispose" to --disposed--;
Claim 20, column 15, line 15, between "including" and "porous" insert --a--; and
Claim 35, column 16, line 20, between "termination" and "in" insert --as defined--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks